United States Patent

Cain et al.

Patent Number: 5,939,114
Date of Patent: *Aug. 17, 1999

[54] ICE-CREAM COATING COMPOSITIONS

[75] Inventors: Frederick William Cain, Voorburg; Helga Gerda A. Manson née van der Struik, Amstelveen; Jeroen Nicolaas M. van Straalen, Wognum, all of Netherlands

[73] Assignee: Loders-Croklaan B.V., Wormerveer, Netherlands

[ * ] Notice: This patent is subject to a terminal disclaimer.

[21] Appl. No.: 08/817,904

[22] PCT Filed: Sep. 22, 1995

[86] PCT No.: PCT/EP95/03750

§ 371 Date: Mar. 31, 1997

§ 102(e) Date: Mar. 31, 1997

[87] PCT Pub. No.: WO96/10339

PCT Pub. Date: Apr. 11, 1996

[30] Foreign Application Priority Data

Sep. 30, 1994 [EP] European Pat. Off. ............ 94202832

[51] Int. Cl.⁶ .................. A23G 9/02; A23D 9/00
[52] U.S. Cl. .................. 426/101; 426/100; 426/607
[58] Field of Search .................. 426/100, 101, 426/607

[56] References Cited

U.S. PATENT DOCUMENTS

| | | | |
|---|---|---|---|
| 4,414,239 | 11/1983 | Oven | 426/607 |
| 4,430,350 | 2/1984 | Tresser | 426/606 |
| 4,560,563 | 12/1985 | Tresser | 426/606 |
| 5,017,392 | 5/1991 | Bombardier | 426/100 |
| 5,215,780 | 6/1993 | Meidenbauer | 426/607 |
| 5,273,763 | 12/1993 | Merz | 426/101 |
| 5,431,947 | 7/1995 | Bennett | 426/606 |
| 5,431,948 | 7/1995 | Cain | 426/607 |

FOREIGN PATENT DOCUMENTS

| | | | |
|---|---|---|---|
| 0 189 669 A1 | 8/1986 | European Pat. Off. | C11B 7/00 |
| 0 424 997 A2 | 5/1991 | European Pat. Off. | A23D 9/00 |
| 0 427 309 B1 | 5/1991 | European Pat. Off. | C11C 3/08 |
| 0 428 200 A1 | 5/1991 | European Pat. Off. | C11B 7/00 |
| 0 483 414 A1 | 5/1992 | European Pat. Off. | A23D 9/00 |
| 2 435 206 | 4/1980 | France | A23G 1/00 |

OTHER PUBLICATIONS

Derwent Publications Ltd., AN–74150c (Sep. 1980).

Primary Examiner—Carolyn Paden
Attorney, Agent, or Firm—Pillsbury, Madison & Sutro LLP

[57] ABSTRACT

Ice-cream coating compositions with reduced waxiness are obtained by using as fat the following triglyceride-compositions:

<10% of SSS
25–80% of SUS
2–20% of SSU
8–60% of (SSU + USU)
<10% of $U_3$

S=saturated fatty acid with $C_{16}$–$C_{24}$
U=unsaturated fatty acid $C_{18}$+, while the $C_{16}$:$C_{18}$—saturates weight ratio of the triglycerides is >2.0.

15 Claims, No Drawings

ICE-CREAM COATING COMPOSITIONS

This application is the national phase of international application PCT/EP95/03750, filed Sep. 22, 1995 which designated the U.S.

BACKGROUND OF THE INVENTION

1. Field of the Invention

The invention relates to ice-cream coating compositions containing a fat having a special triglyceride composition and to use of such compositions to provide coated ice creams.

2. Description of the Related Art

Conventional ice-cream coatings are based on lauric fats. Preferred lauric fats applied for this purpose are coconut oil and palm kernel oil or fractions thereof. However, such fats, in particular the coconut oil-based fats, have drawbacks when applied in ice-cream coatings. Apart from the fact, that the SAFA-level, i.e. the total of saturated fatty acids and trans-unsaturated fatty acids is very high (90–100%), it was also found that the use of these fats in ice-cream coatings led to the occurrence of waxiness upon eating. This waxiness problem was considered as a severe problem and much effort has been invested in order to overcome this problem; however, so far this effort did not lead to a satisfactory and economically feasible solution.

In EP 502,697 chocolate compositions are disclosed, wherein the fat phase is based on a fat with 10–85 wt % of $S_2U$-triglycerides and with 15–90 wt % of $SU_2$-triglycerides, while at least 35% of $S_2U$ consist of $S_2Ln$ (Ln=linoleic acid). According to the specification fats, wherein the $S_2Ln$ mainly consist of SSLn are useful for frozen desserts. In the examples 16, 17 and 18 different applications of these fats are illustrated; i.e. in ice-cream-in sugar corn cup; as cub-like chocolates in ice-cream and as ice-cream bars containing a chocolate centre. In the text the application of those fats in ice-cream coating is given in a generic sense. It is further explained in the text that $U_3$ should be present for oral mouth feel, but cannot be afforded because of cooling problems. Moreover, the use of fats high in SSLn means that no natural fats can be applied, as no natural fat is known that is high in SSLn. Therefore, the fats must be synthesized.

From EP 189669 a fractionation-process is known, wherein palm oil is fractionated into a product, comprising
(a) at least 70% SOS
(b) less than 9.5% SSO
(c) 4–20% combined SUU/UUU/SLS
(d) less than 8% SLS
(e) less than 2.5% SSS
(f) having a $C_{18:0}/C_{16:0}$-ratio of less than 0.8 The products can be applied for the preparation of chocolate coatings, however nothing is disclosed about specific levels of (SUU+USU)—and $U_3$ triglycerides, nor about its use in ice-cream coatings.

SUMMARY OF THE INVENTION

We found new ice-cream coating compositions, that overcome the problem of waxiness. These new compositions can be based both on natural fats and on synthetic fats.

Therefore, our invention concerns ice-cream coating compositions, containing a fat with the following triglyceride composition:

SSS: <10 wt %, preferably <5 wt %, most preferably <3 wt %;

SUS: 25–80 wt %, preferably 35–75 wt %;
SSU: 2–20 wt %, preferably 5–18 wt %;
(SUU+USU): 8–60 wt %, preferably 12–25 wt %
$U_3$:<10 wt %, preferably <5 wt %.

wherein S=saturated fatty acid with 16–24, preferably 16–18 C-atoms and U=unsaturated fatty acid with at least 18 C-atoms, while the $C_{16:0}:C_{18:0}$ weight-ratio of the triglyceride is more than 2.0.

DETAILED DESCRIPTION OF THE INVENTION

Although S can be any saturated fatty acid with 16–24 C-atoms, we prefer to use fats wherein S is a saturated fatty acid with 16–18 C-atoms. Very suitable fats are based on fats wherein the $C_{16:0}:C_{18:0}$ weight ratio is more than 5.0, preferably more than 8.0.

U in above definition could be any mono- or poly unsaturated fatty acid with at least 18 C-atoms. This thus includes both cis and trans unsaturated fatty acids. However, we prefer to use the cis-isomers, as those are considered to be healthier than the trans isomers. A particular preference exists for fats, wherein U comprises $C_{18:1}$ and $C_{18:2}$, while the weight-ratio SOS:SLnS is more than 2.0, preferably >6.0 (O=$C_{18:1}$ and Ln=$C_{18:2}$).

As the fats present in our compositions must display good oral properties during eating, while the mouth-temperature during eating of ice-cream is between 15 and 25° C., the solid fat-content of those fats at 25, 20 and at 0° C. is important. Those fats therefore preferably have a S.F.I. (measured by NMR-pulse, not stabilized) at the temperature indicated of:

$N_0$>50, preferably >60, most preferably 70–90
$N_{20}$>20, preferably >35, most preferably 40–70
$N_{25}$=0–40, preferably 7–30.

Another advantage of our novel ice-cream coating compositions is, that it enables us to apply fats with lower SAFA-contents than the conventional coconut oil based fats. Therefore, we prefer to apply fat-compositions, wherein the total content of saturated fatty acids, plus trans unsaturated fatty acid is less than 80 wt %, preferably less than 70 wt %, most preferably 50–65 wt %.

The triglyceride-compositions that we apply can be made by synthetic routes, e.g by chemical or enzymatic (inter)-esterification of appropriate starting materials. Examples thereof being: glycerol, monoglycerides, diglycerides and triglycerides, which can be converted with the appropriate fatty acids, fatty acid esters, anhydrides, or other triglycerides. However, a far more convenient route for the preparation is by using natural fats or fractions thereof.

Therefore, we prefer to apply triglycerides in our compositions, wherein the triglycerides are a blend of fats A and B, wherein fat A is a fat with an SUS-level of more than 50 wt %, preferably more than 70 wt % and fat B is a liquid fat with an ($U_2S+U_3$) content of more than 35 wt %, preferably more than 55 wt %, while the weight ratio $U_2S$ : $U_3$ in fat B preferably is more than 1.0. In this blend fats A and B can be derived from natural fats, in particular from palm oil, cocoa butter, illipe and shea. The use of palm oil base triglycerides is preferred, because of its availability and its price.

It will be evident, that part of our invention is also an ice-cream coating, comprising sugar, fat and optionally one or more of the following components: cocoa powder, milk components and emulsifiers, wherein the fat at least partly consists of the fat defined above. In particular ice-cream coating having the following composition 25–60 wt % of sugar 20–70 wt % of the fat as defined above, and 0–30 wt % of at least one of the components from the group consisting of: cocoa powder, milk protein, lactose, emulsifier and one or more flavours, such as strawberry, raspberry, lemon, yoghurt, etc. have shown to give good results.

Coated ice-creams, wherein the coating has this composition are also part of our invention.

In a last embodiment our invention also comprises the use of a fat in ice cream coatings, wherein a fat with the composition as defined above is applied in the coating in order to avoid waxiness.

EXAMPLES 1.1 Ice-cream coatings were made according to the following recipe:

|  | wt % |
| --- | --- |
| sugar | 25.8 |
| fat | 59.2 |
| cocoa powders N/11/N | 13.0 |
| skim milk powder | 1.7 |
| lecithin | 0.3 |

In above recipe three different fats were applied (A,B and C). Fat A being a fat according to our invention (a mixture of palm oil fractions), fat B also being a fat according to the invention (another mixture of palm oil fractions) and fat C being coconut oil as reference fat.

The triglyceride composition of fats A, B and C is given below:

| Fat | SSS | SUS | SSU | $SU_2$ | $U_3$ | $C_{16}/C_{18}$ (Sat) |
| --- | --- | --- | --- | --- | --- | --- |
| A | 2.5 | 71.1 | 7.9 | 15.8 | 1.3 | 8.3 |
| B | 2.1 | 59.2 | 6.5 | 27.9 | 2.3 | 8.6 |
| C | 83.7 | 4.2 | 11.3 | 0.8 | 0 | 3.3 |

These fats displayed the following N-line (NMR; not stabilized)

| Fat | $N_0$ | $N_{20}$ | $N_{25}$ |
| --- | --- | --- | --- |
| A | 89.7 | 65.2 | 23.2 |
| B | 80.7 | 45.2 | 9.5 |
| C | 90.5 | 39.5 | 2.2 |

1.2 The coatings were made by mixing the ingredients, refining the blend on a 3-roll refiner and conching. The compositions were kept at about 40° C. and ice-creams were dipped into the compositions.

1.3 Dripping time, drying time and weight of the coating were evaluated. The results are mentioned in the table below:

| Fat | coat. T. °C. | drip time (sec) | dry-time (sec) | weight % on product |
| --- | --- | --- | --- | --- |
| A | 40 | 8 | 76 | 16 |
| B | 40 | 8 | 93 | 16 |
| C | 40 | 11 | 46 | 14 |

1.4 Sensory evaluations by a taste-panel after 1 week storage at −20° C. demonstrated that the products wherein fats A or B were used were slightly softer and less brittle than the products, containing fat C. However, the products containing A or B were less waxy, than the products containing C.

2.1 The recipe of example 1 was applied again. However, two other fats D and E were compared with our fat A. Fats D and E are based on a blend of a palm oil fraction and a liquid oil (sunflower oil for D and soybean oil for fat E).

The triglyceride composition of fats D and E was:

| Fat | SSS | $S_2U$ | $U_2S$ | $U_3$ | $C_{16}/C_{18}$ (Sat) |
| --- | --- | --- | --- | --- | --- |
| D | 2.3 | 74.2 | 6.8 | 16.1 | 7.1 |
| E | 2.3 | 75.2 | 10.0 | 11.3 | 7.5 |

So fats D and E are higher in the very soft $U_3$-triglyceride than the fats according to our invention.

2.2 Although fats D and E led to dripping times, drying times and weight% coating on product, comparable with the use of our fats A and B, we also found in the sensory evaluation, that the products containing D and E were more waxy, than the products containing our fats A or B. This is unexpected, as it was assumed that waxiness would be related with the amount of liquid triglyceride (=$U_3$) in the fat composition (the more $U_3$ the less waxier). We found the opposite.

3.1 The recipe of example 1 was applied again. However, four other fats (F, G, H and I) were applied. Fat F was a mixture of Shea and palm-fractions, fat G was a mixture of Shea, Illipe and palm-fractions: fat H was another mixture of Shea and palm-fractions, while fat I was also a mixture of Shea and palm-fractions, however having a different composition.

The particulars of fats F, G, H and I are given below:

| Fat | SSS | SUS | SSU | $U_2S$ | $U_3$ | $C_{16:0}/C_{18:0}$ |
| --- | --- | --- | --- | --- | --- | --- |
| F | 1.8 | 68.4 | 4.0 | 20.8 | 2.4 | 0.5* |
| G | 0.5 | 67.4 | 5.2 | 21.3 | 2.2 | 1.5* |
| H | 2.9 | 64.5 | 6.1 | 22.3 | 2.0 | 2.7 |
| I | 3.5 | 73.9 | 5.6 | 14.7 | 1.3 | 2.2 |

*not according to the invention.

These fats displayed the following N-values:

| Fat | $N_0$ | $N_{20}$ | $N_{25}$ |
| --- | --- | --- | --- |
| F | 75.6 | 47.8 | 33.7 |
| G | 74.9 | 18.5 | 3.8 |
| H | 74.5 | 17.3 | 6.4 |
| I | 85.0 | 32.0 | 9.8 |

3.2. Coatings were made according to example 1.2.
3.3. The following results were obtained:

| Fat | Driptime (sec) | Dry-time (sec) | Weight % on product |
|---|---|---|---|
| F | 10 | 78 | 21 |
| G | 9 | 76 | 18 |
| H | 11 | >120 | 19 |
| I | 10 | 63 | 18 |

The coatings with fats F and G were waxy. The coatings with fats H and I were les waxy than the coating with fat C (example 1).

We claim:

1. Ice-cream coating composition, containing a fat with the following triglyceride composition:
   SSS: <10 wt %;
   SUS: 25–80 wt %;
   SSU: 2–20 wt %;
   (SUU+USU): 8–60 wt % and
   $U_3$:<10 wt %,
wherein S=saturated fatty acid with 16–24 C-atoms and U=unsaturated fatty acid with at least 18 C-atoms, while the $C_{16:0}:C_{18:0}$ weight ratio of the triglyceride is more than 2.0, said triglyceride composition displaying a solid fat index (NMR-pulse; not stabilized) at the temperature indicated of:
   $N_0$>60;
   $N_{20}$>20; and
   $N_{25}$ equal to 7–30,
said coating composition being further characterized by its reduced waxiness.

2. Ice-cream coating composition according to claim 1, wherein S=saturated fatty acid with 16–18 C-atoms, while the weight ratio $C_{16:0}:C_{18:0}$ is more than 5.0.

3. The composition of claim 2 wherein the weight ratio $C_{16:0}:C_{18:0}$ of the triglyceride is more than 8.0.

4. Ice-cream coating composition according to claim 1 or 2 wherein U comprises $C_{18:1}$ and $C_{18:2}$, while the weight-ratio SOS:SLnS is more than 2.0 wherein O=$C_{18:1}$ and Ln=$C_{18:2}$.

5. The composition of claim 4 wherein U comprises $C_{18:1}$ and $C_{18:2}$ and the weight ratio of SOS:SLnS is more than 6.0.

6. Ice-cream coating composition according to claim 1, wherein the triglycerides have a content of saturated fatty acids, plus trans unsaturated fatty acid of less than 80 wt %.

7. The composition of claim 6 wherein said acid content is 50–65 wt %.

8. Ice-cream coating composition according to claim 1, wherein the triglycerides are a blend of fats A and B, wherein fat A is a fat with an SUS-level of more than 50 wt % and fat B is a liquid fat with an ($U_2S+U_3$) content of more than 35 wt %.

9. Ice-cream coating composition according to claim 8, wherein fats A and B are both fractions of palm oil.

10. The composition of claim 8 wherein fat A is a fat with an SUS-level of more than 70 wt % and, fat B is a liquid fat with an ($U_2S+U_3$) content of more than 55 wt %.

11. In a method for preparing a coated ice cream, the improvement which comprises coating the ice cream with the coating composition according to claim 1, said coating being characterized by its freedom from waxiness.

12. An ice-cream coating composition according to claim 1 wherein:

SSS is <3 wt %;
   SUS is 35–75 wt %;
   SSU is 5–18 wt %;
   SUU + USU is 12–25 wt %; and
   $U_3$ is <5 wt %.

13. The composition of claim 1 wherein:
   $N_0$ is 70–90,
   $N_{20}$ is 40–70, and
   $N_{25}$ is 7–30.

14. Ice cream coating, comprising:
   25–60 wt % of sugar
   20–70 wt % of the triglycerides, as defined in claim 1,
   0–30 wt % of at least one of the components from the group consisting of: cocoa powder, milk protein, lactose, emulsifier, and one or more flavours.

15. Coated ice creams, wherein the coating comprises the composition according to claim 14.

* * * * *